(12) United States Patent
Geers et al.

(10) Patent No.: US 11,467,108 B2
(45) Date of Patent: Oct. 11, 2022

(54) METHOD FOR CHARACTERIZING PARTICLES PRODUCING HEAT WHEN EXPOSED TO LIGHT AND DEVICE FOR CARRYING OUT THE METHOD

(71) Applicant: NANOLOCKIN GMBH, Fribourg (CH)

(72) Inventors: Christoph Geers, Fribourg (CH); Mathias Bonmarin, Zürich (CH); Alke Fink, Düdingen (CH); Christophe A. Monnier, Bottmingen (CH)

(73) Assignee: NANOLOCKIN GMBH, Fribourg (CH)

( * ) Notice: Subject to any disclaimer, the term of this patent is extended or adjusted under 35 U.S.C. 154(b) by 518 days.

(21) Appl. No.: 16/617,626

(22) PCT Filed: May 9, 2018

(86) PCT No.: PCT/EP2018/061958
§ 371 (c)(1),
(2) Date: Nov. 27, 2019

(87) PCT Pub. No.: WO2018/219610
PCT Pub. Date: Dec. 6, 2018

(65) Prior Publication Data
US 2020/0182813 A1    Jun. 11, 2020

Related U.S. Application Data
(60) Provisional application No. 62/512,300, filed on May 30, 2017.

(51) Int. Cl.
*G01N 25/48*    (2006.01)
*G01N 15/02*    (2006.01)
(Continued)

(52) U.S. Cl.
CPC ..... *G01N 25/4826* (2013.01); *G01N 15/0227* (2013.01); *G01N 15/1434* (2013.01);
(Continued)

(58) Field of Classification Search
CPC ...... G01N 25/72; G01N 21/88; G01N 29/348; G01N 29/28; G01N 25/00; G01N 29/346;
(Continued)

(56) References Cited

U.S. PATENT DOCUMENTS 8,108,030 B2 *  1/2012  Castella .............. A61B 5/6852
                                            600/474
10,241,028 B2 *  3/2019  Rowe ................. G01N 15/0205
(Continued)

FOREIGN PATENT DOCUMENTS

CN        101960579 A  *  1/2011  ............ G01N 25/72
CN        104677944 A    6/2015
(Continued)

OTHER PUBLICATIONS

Monnier, C.A., et al., A lock-in based method to examine the thermal signatures of magnetic nanoparticles in the liquid, solid and aggregated states, Nanoscale, 2016, vol. 8, No. 27, pp. 13321-13332, UK, XP055493857.
(Continued)

*Primary Examiner* — Michael P Stafira
(74) *Attorney, Agent, or Firm* — Hudak, Shunk & Farine Co. LPA

(57) ABSTRACT

A method for characterizing particles producing heat when exposed to light. The method includes the steps of stimulating a particle sample alternatingly with homogenous light waves with at least a first wavelength and a second wavelength, detecting by a detector heat radiated by the particle sample as a result of the stimulation, thereby yielding time-dependent images of a modulated heat distribution
(Continued)

pattern, converting the time-dependent image of the modulated heat distribution pattern into the frequency domain and demodulating the image of the modulated heat distribution pattern, and determining a physical property of the particle sample based on the at least one demodulated image of heat distribution.

19 Claims, 4 Drawing Sheets

(51) Int. Cl.
  *G01N 15/14* (2006.01)
  *G01N 15/06* (2006.01)
(52) U.S. Cl.
  CPC . *G01N 15/1463* (2013.01); *G01N 2015/0693* (2013.01); *G01N 2015/1454* (2013.01)
(58) Field of Classification Search
  CPC ............ G01N 29/228; G01N 21/6489; G01N 21/9501; G01N 25/18; G01N 21/71; G01N 29/345; G01N 21/35; G01N 1/00; G01N 2021/8461; G01N 2291/2694; G01N 2291/044; G01N 2291/101; G01N 29/2412; G01N 29/449; G01N 2291/02881; G01N 21/95; G01N 29/46; G01N 21/8851; G01N 2203/0694; G01N 2021/1731; G01N 2203/0051; G01N 2203/0062; G01N 29/045; G01N 3/60; G01N 21/171; G01N 21/66; G01N 2291/02483; G01N 2291/2638; G01N 29/2462; G01N 33/20; G01N 29/12; G01N 21/64; G01N 2201/0612; G01N 2291/0231; G01N 2291/014; G01N 2291/0289; G01N 2291/0422; G01N 2291/106; G01N 29/40; G01N 2021/8887; G01N 25/20; G01N 21/8806; G01N 29/04; G01N 29/2418; G01N 2223/079; G01N 2223/086; G01N 2223/33; G01N 2291/2697; G01N 29/223; G01N 29/4436; G01N 21/9505; G01N 2203/0617; G01N 2203/0635; G01N 2203/0641; G01N 2291/0423; G01N 2291/0427; G01N 27/902; G01N 3/066; G01N 3/068; G01N 3/08; G01N 3/20; G01N 33/442; G01N 21/63; G01N 21/958; G01N 22/02; G01N 2291/0421; G01N 23/227; G01N 29/2437; G01N 29/4445; G01N 15/0227; G01N 15/1434; G01N 15/1463; G01N 19/08; G01N 2015/0693; G01N 2015/1454; G01N 2021/646; G01N 21/3581; G01N 25/005; G01N 25/32; G01N 25/4826; G01N 27/90; G01N 29/07; G01N 2021/8438; G01N 21/359; G01N 21/6456; G01N 21/84; G01N 21/93; G01N 2291/0258; G01N 2291/02827; G01N 2291/102; G01N 29/069; G01N 29/4427; G01N 2015/1479; G01N 2021/1714; G01N 2021/8416; G01N 2021/8896; G01N 21/1717; G01N 21/39; G01N 21/45; G01N 21/636; G01N 21/956; G01N 2201/06113; G01N 2201/0697; G01N 23/046; G01N 29/043; G01N 29/0654; G01N 29/0672; G01N 29/11; G01N 29/265; G01N 29/34; G01N 29/343; G01N 29/4472; G01N 33/202; G01N 19/04; G01N 2021/8427; G01N 2021/8472; G01N 2021/8867; G01N 2021/8874; G01N 2021/95638; G01N 21/6408; G01N 21/70; G01N 21/8422; G01N 21/8803; G01N 2203/0073; G01N 2203/0222; G01N 2291/2693; G01N 29/06; G01N 3/06; G01N 3/18; G01N 3/32; G01N 3/34; G01N 3/36; G01N 33/0054; G01N 33/08
  See application file for complete search history.

(56) References Cited

U.S. PATENT DOCUMENTS

2013/0278749 A1* 10/2013 Mandelis ........... G01N 21/9501
  348/87
2016/0109393 A1* 4/2016 Mandelis ........... G01N 29/2418
  250/341.6

FOREIGN PATENT DOCUMENTS

| DE | 102012215120 A1 | * | 2/2014 | ........... G01N 27/403 |
| DE | 102015207551 A1 | * | 10/2016 | ............... G01N 1/44 |
| EP | 3282249 A1 | * | 2/2018 | |
| WO | 2010077865 A2 | | 7/2010 | |
| WO | 2010099964 A2 | | 9/2010 | |

OTHER PUBLICATIONS

Lemal, P. et al., Lock-in thermography as a rapid and reproducible thermal characterization method for magnetic nanoparticles, Journal of Magnetism and Magnetic Materials, 2016, vol. 427, pp. 206-211, Elsevier, Amsterdam, NL, XP029887683.

* cited by examiner

METHOD FOR CHARACTERIZING PARTICLES PRODUCING HEAT WHEN EXPOSED TO LIGHT AND DEVICE FOR CARRYING OUT THE METHOD

FIELD OF THE INVENTION

The invention resides in the field of lock-in thermography and relates to a method and a device for characterizing particles producing heat when exposed to light according to the independent claims.

BACKGROUND OF THE INVENTION

Lock-in thermography (LIT) is a known method for examining internal structures of objects by applying periodic energy waves and analyzing the resulting temperature profile of the area to be examined. Generally, when the input wave penetrates an object's surface, the wave is partially reflected in regions where the sample to be examined is non-homogenous. The reflected wave interferes with the input wave and creates interference patterns in the local surface temperature of the object. Analysis of these interference patterns makes it possible to identify the internal structure of said object. LIT is a well known technique for material characterization but can also be used in other application, e.g. characterizing tissues in vivo and the detection of skin lesions.

With respect to this type of application it has been discovered that usage of nanoparticles in detection, characterization and potentially destruction of cancerous tumors is a very promising path in this field, particularly in view of the potential possibility of destroying tumors by non-invasive techniques.

Nano- and microparticles offer a variety of unique (e.g. optical, magnetic, mechanic etc.) properties. A particular property refers to the particles' capability of producing heat when exposed to an electromagnetic wave, e.g. light with a certain wavelength. The amount of heat produced by the particles depends on the particle's material/composition, size, or shape, as well as on the wavelength of the electromagnetic waves. In this context, in particular metal containing nano- and microparticles (e.g. pure metals, metal alloys, metal oxides etc.), but also carbon based materials (e.g. carbon nanotubes, graphene, fullerenes), can produce heat upon electromagnetic wave absorption or scattering.

Currently lasers are mostly used for particle stimulation and standard calorimetric methods (e.g. fiberoptic cables or thermocouples) are used to measure the produced heat. However, the latter only provide data from single one-dimensional points, and are consequently very limited, regarding reproducibility (in regard to sensor positioning), accuracy and precision. Although such set-ups is easy to install, the correct data analysis is challenging. In addition, those calorimetric methods are typically very time consuming and invasive. Also, heat losses, which occur due to convection or conduction during measurements are not taken into account.

Today a variety of methods are available for the detection and characterization of nano- and microparticles. The used methods typically require labelling with fluorescent dyes, complex data analysis, and substantial sample preparation, which can introduce artefacts. In addition, particle characterization in complex environments (such as e.g. crowded protein solutions etc.) is extremely difficult.

The above mentioned lock-in thermography (LIT) can also be used to detect the specific heat produced by the particles upon modulation of the stimulating electromagnetic waves. However, usage of nanoparticles in LIT gives rise to problems involving a number of factors like experimental set-ups and measurement conditions. Therefore, choosing the right experiential set-up (thermal camera, light source, sample holder) and measurement conditions (light wavelength, light intensity, demodulation algorithm) for micro- and nanoparticle characterization is of great importance.

SUMMARY OF THE INVENTION

It is an objective of the present invention to avoid or at least to minimize the aforementioned disadvantages of the existing solutions with respect to characterization of particles, in particular of nanoparticles.

In a first aspect of the invention the objective is solved by a method for characterizing particles producing heat when exposed to light. The method comprises the steps described in the following.

In a first step, a particle sample containing at least one particle is stimulated, during a predefined measurement period, alternatingly with homogenous light waves with at least a first wavelength and a second wavelength by means of at least one light source. This is done in such a way that the light waves with the first wavelength don't overlap with the light waves with the second wavelength with respect to their time base.

In a second step, heat radiated by the at least one particle of the particle sample as a result of the stimulation is detected by means of a detector. The detection yields at least a time-dependent image of a modulated heat distribution pattern for at least a region of the particle sample.

In a third step, the time-dependent image of the modulated heat distribution pattern is converted into the frequency domain and the at least one image of the modulated heat distribution pattern is demodulated. Preferably, the demodulation is carried out by lock-in thermography.

In a fourth step, a physical property of the particle sample is determined based on the at least one demodulated image of heat distribution.

In a second aspect of the invention the objective is solved by a device for carrying out the method according to the first aspect of the invention. The device comprises a homogenous light source adapted to emit light with at least a first and a second wavelength. Intensities of the light with the first and the second wavelength emitted by the homogenous light source are adjustable independently from one another. Furthermore, the device comprises a sample holder carrying a particle sample with at least one particle. The sample holder is arranged in such a way that the particle sample can be illuminated by the homogenous light source. The device also comprises a detector, configured and arranged in such a way that it detects heat radiated by the particle sample as a result of stimulation of the particle sample with light emitted by said light source. Preferably, the detector is an infrared camera.

The method and device according to the invention have the advantage that, compared to fluorescent microscopy, the proposed invention does not require labeling of the particles with special fluorescent dyes. Such labeling was shown to change the properties and behavior of particles. Differences between labeled and non-labeled particles include e.g. changed particle surface charge or interaction with surfaces/molecules/other particles. In addition, quenching of the fluorescent dye can disturb the measurements.

Furthermore, compared to dark-field hyperspectral microscopy, the proposed invention does not require cost-intensive instrumentation, very sophisticated data treatment or extensive know-how. Even more important, dark-field hyperspectral microscopy reaches its limits when detecting or characterizing nanoparticles in more complex matrices.

The advantage of the proposed invention over electron microscopy is that it does not require complex sample preparation, in particular the drying of the sample, which can introduce artefacts. Furthermore, the method according to the invention is faster than electron microscopy.

In embodiments of the method, the property of the particle sample is chosen from the group: location of a certain particle in the particle sample, intensity of heat radiation of the particle, intensity of heat radiation of the particles as function of their size, shape, material, colloidal state, aggregation state, particle concentration in a carrier medium carrying the particles, or a combination thereof. Advantageously, the present method allows characterization of particles, particularly nanoparticles, with respect to a large variety of physical properties.

In embodiments of the device, the light source is an LED light source with at least two LED-arrays. Each LED-array generates light with the first wavelength or the second wavelength, respectively. Advantageously, by using an LED light source instead of lasers (prior art), by means of which only a "point" characterization can be achieved, it is possible to generate a 2-dimensional homogenous light stimulation and consequently to obtain an extended spatial heat distribution of particles, particularly nanoparticles, as response to said stimulation with homogenous light. Other advantages are low price;

much easier to perform frequency modulation as switching between two lasers would be complicated;

a laser with a variable wavelength would also be complicated;

less dangerous; LED beam is not collimated and therefore less dangerous for the user.

LEDs produce unpolarized light.

BRIEF DESCRIPTION OF THE DRAWINGS

Embodiments, advantages and applications of the invention result from the dependent claims and from the now following description by means of the figures. It is shown in:

DETAILED DESCRIPTION OF THE INVENTION

Figure 1:
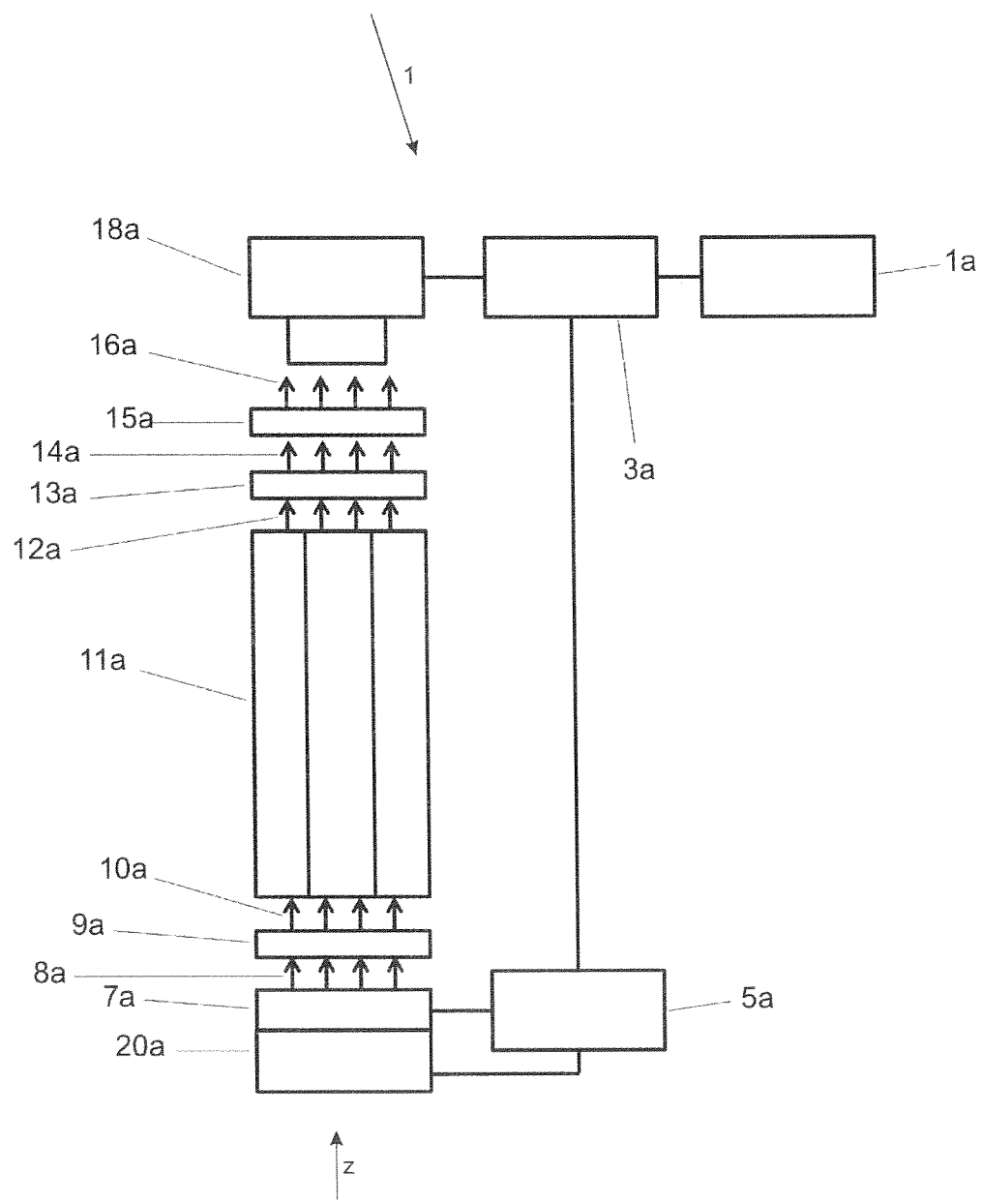
FIG. 1 a schematic view of an embodiment of a device according to the invention.

In the following same reference numerals denote structurally or functionally same elements of the various embodiments of the invention.

In the present context, the term "particle sample" is understood as an entity consisting of one or more, typically a plurality, of nanoparticles or microparticles which are embedded in a carrier material. In other words, the particle sample encompasses the particles and the carrier medium.

For the purposes of this document the terms "nanoparticle" is understood as a material with typical sizes of 1 to 100 nm in at least one dimension, and the term "microparticles" is understood as a material at nanoscale with typical sizes of 0.1 µm to 100 µm in at least one dimension.

In the context of the present document, the term "light" or "light waves" is not limited to visible light but shall as well encompass wavelengths in the ultraviolet and/or infrared spectrum.

FIG. 1 shows a schematic view of an embodiment of a device 1 according to the invention. The path of the electromagnetic radiation, i.e. the path of light, is depicted by the arrows 8a, 10a, 12a, 14a.

The device comprises a light source 7a, which is preferably an LED light source 7a with at least two LED-arrays. Each LED-array generates light with the first wavelength or the second wavelength, respectively. It is preferred that the first and the second wavelength emitted by the light source are each chosen independently from one another in a range between 100 nm and 2000 nm. In order to better differentiate between the effects of each of the two light waves on the particle sample, a gap between the first and the second wavelength is preferably of at least 100 nm. Generally, the gap between the two wavelengths should be at least the averaged width half maximum of each wavelength. The structure of the LED light source 7a is described in more detail in connection with FIG. 2. The LED light source is connected to a cooling unit 20a for dissipating the heat produced by the LED light source 7a. Furthermore, it is connected to an LED driver 5a for controlling the LEDs of the LED light source.

An optional first filter 9a is arranged in the device 1 after (in the main light propagation direction according to the arrows) the LED light source 7a. The first filter 9a is used to filter "thermal radiation" that could originate from the LEDs (as they produce heat). This thermal signal would otherwise also be sensed by the camera.

A plurality of filters arranged one after the other may also be used if necessary.

The device according to the invention further comprises a light mixing rod 11a for additional light homogenisation arranged between the light source 7a and a sample holder 15a of the device 1. In this exemplary embodiment, the light mixing rod 11a has a hexagonal shape with respect to cross section, however other shapes may also be used. The light mixing rod can also be a hollow light mixing rod. For example, to design a light mixing rod working at different wavelengths ranging from UV to NIR, a hollow hexagonal shaped aluminium rod can be used from which the inside part is covered by a UV reflective foil.

The sample holder 15a carries the particle sample to analyse or characterize, respectively. Preferably, the particles of the particle sample are chosen from the group consisting of nanoparticles and microparticles, the definition of which is given above. It is noted that the invention is not limited thereto and may also be used in connexion with other types of particles. The sample holder 15a is arranged in such a way that the particle sample can be illuminated by the homogenous light source, with the particle sample facing a detector 18a described below, such that light emitted by the LED light source 7a illuminates the particle sample through the sample holder 15a.

A second optional filter 13a is arranged between the light mixing rod 11a and the sample holder 15a, for additional filtering of secondary light. It is noted that the first and the second filter 9a, 13a may also be chosen depending on the accuracy of the LED light source in terms of emitted wavelengths. If the LED light source also emits other wavelengths than the desired wavelengths, these filters 9a, 13a may also be used to filter out undesired wavelengths originating from the LED light source. This filter could be a polarisation filter used to select one polarisation state of the light.

Furthermore, a detector 18a is provided for the device 1 according to the invention. The detector 18a, which is an imaging device or a sensor, is in this exemplary case an infrared camera 18a, configured and arranged in such a way that it detects heat 16a radiated by the particle sample as a result of stimulation of the particle sample with light emitted by said LED light source 7a. The type of detector or imaging device is chosen in accordance with the used wavelengths for the stimulating light. Obviously, the infrared camera is chosen for wavelengths in the infrared spectrum. Other types of detectors may be used instead, e.g. when using ultraviolet light. In embodiments it is also possible to use a camera or COD-sensor which is sensitive to a large part of the light spectrum defined above (100 nm to 2000 nm).

The device 1 further comprises a processing unit 3a and a display unit 1a, typically a computer. The processing unit is electrically connected to the detector 18a, acting a frame grabber for the images recorded by the detector 18a. Furthermore, it is electrically connected to the LED driver 5a for controlling the timing and sequences of the illumination pattern of the LED light source 7a. Furthermore it is also used for carrying out mathematical operations required for processing the images it receives from the detector 18a. Another task is to synchronize the illumination (stimulation) sequence with the recording of time-dependent heat distribution images. Finally, it serves together with the display 1a as user interface for the operator of the device 1.

As can be seen in the exemplary setup of the individual elements of the device 1, the LED light source 7a, the sample holder 15a and the detector 18a are arranged in a row in direction of the arrow z.

Figure 3:
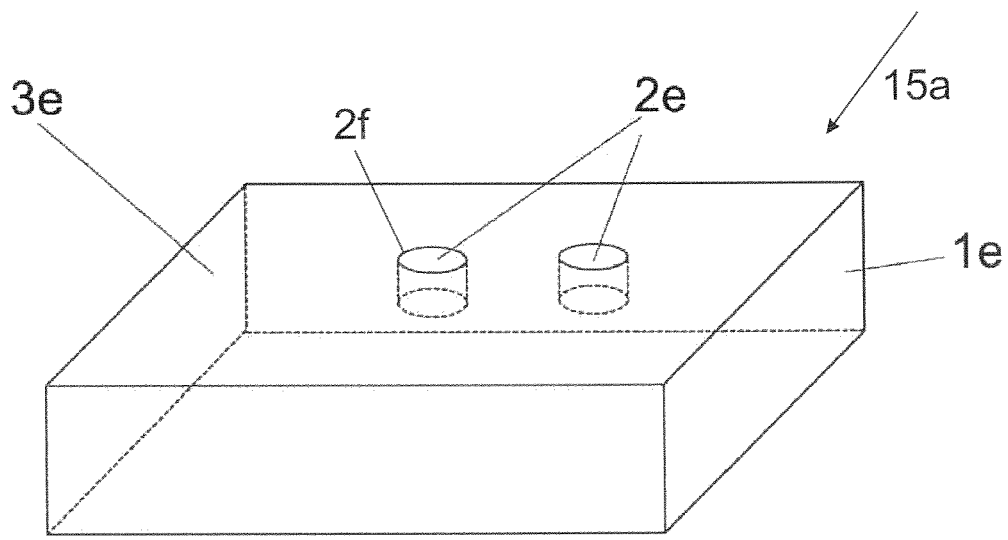
FIG. 3 a perspective view of an exemplary sample holder of the device of FIG. 1.

In an alternative embodiment (not shown), the light source 7a and the detector 18a may both be arranged on a same side of the sample holder 15a in such a way that each of them faces the particle sample at a certain angle with respect to a surface 3e of the exposed particle sample, which is shown in FIG. 3. The values of these two angles are typically equal. This embodiment is more compact than the embodiment described above and doesn't require the light mixing rod 11a or a transparent sample holder 15a. In the row arrangement the angle between the light source and the detector is zero. As a result, there is no need to compensate for it, i.e. if the detector makes an angle with the sample surface, there is the need to correct for image distortion. If the light source makes an angle with the sample surface, there is the need to correct for inhomogeneous illumination.

Figure 2:
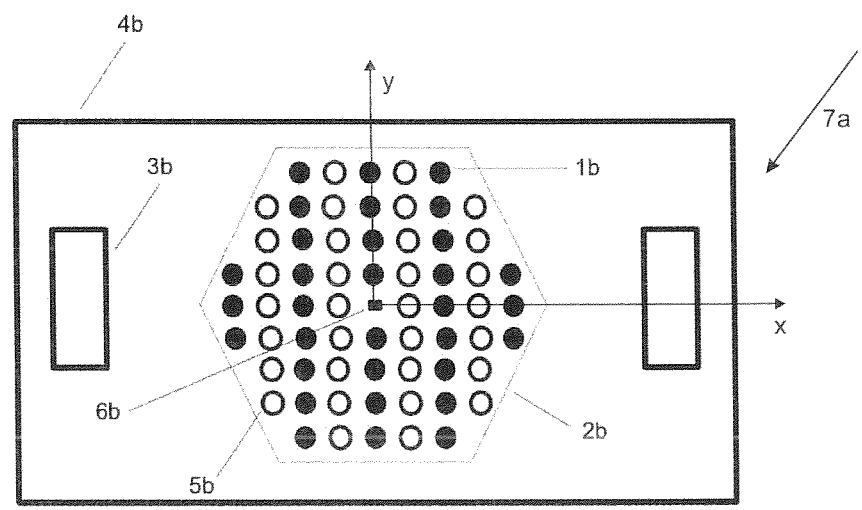
FIG. 2 a schematic view of a light source of the device of FIG. 1.

FIG. 2 shows a schematic view of a light source of the device of FIG. 1 as seen from above, i.e. from the direction in which the LED light source 7a emits the stimulation light for the particle sample. As mentioned, the LED light source is composed of two LED arrays, typically diodes, each of which emits light of a different wavelength. Generally, it is preferred that the LED-arrays are arranged in such way with respect to one another that they interpose, such that an LED 1b of one of the LED-arrays is arranged next to an LED 5b of the other LED-array as seen in at least one spatial direction. It is further preferred that the LED-arrays have the same number of LEDs 1b, 5b in order to reach in a simple way substantially the same light intensity for both wavelengths. However, as mentioned, intensities of the light with the first and the second wavelength, respectively, are adjustable independently from one another by the LED driver 5a.

In the exemplary embodiment of FIG. 2, a first LED array 1b (dots) and a second LED array 5b (circles) are provided on a circuit board 4b of the light source 7a, which also has suitable connectors 3b for connecting the LED circuit board 4b with the LED driver 5a. Each LED array 1b, 5b comprises rows of LEDs. The rows of LEDs alternate in the direction of arrow x and each row extends in the direction of arrow y. However, other distributions of the LEDs of the different arrays are readily possible.

Preferably, a temperature sensor 6b is arranged in the middle of the LEDs for monitoring the temperature of the LED circuit board 4b. The LED driver 5a may have means for reading out the temperature value delivered by the temperature sensor 6b and driving the cooling unit 20a depending on this temperature value, additionally to its task of driving the LEDs. In this way an effective cooling of the light source 7a is provided. A constant temperature of the LEDs is desired because there intensity and wavelength of the LEDs are temperature dependent.

Reference 2b denotes a shape of the surface on which the LEDs of the two LED arrays are arranged. It is preferred that this shape corresponds to the shape of the light mixing rod 11a in order to make sure all LEDs emit light into said light mixing rod 11a. In any case, this surface may be smaller than the cross-section of the light mixing rod 11a but preferably not larger. If no light mixing rod 11a is used in a specific embodiment of the device 1, the shape of the surface containing the LEDs may be chosen arbitrarily in order to best fit the intended arrangement of the LED arrays.

FIG. 3 shows a perspective view of an exemplary sample holder 15a of the device 1. The sample holder 15a is exemplarily formed as a cube with a thickness 1e and a surface 3e which is exposed to the detector 18a. It contains sample wells 2f for the particle sample or samples 2e. Other shapes of the sample holder, e.g. a cylinder slice, may also be used.

In the embodiment of the device 1 according to FIG. 1, i.e. where the main elements of the device 1 are arranged in a row extending in z-direction, the sample holder 15a is made of a material which is transparent for the light emitted by the LED light source. This is due to the fact that the LED light source is arranged on the side opposite of the surface 3e which exposes the particle sample or samples 2e. This material preferably has a heat diffusivity below 0.001 m2/s. This corresponds to 10 times the thermal diffusivity of polystyrene. It is also preferred that the material is a plastic or a glass or a transparent polymer.

In the aforementioned alternative embodiment, where the light source 7a and the detector 18a are both arranged on a same side of the sample holder 15a, the sample holder is preferably not transparent for the two wavelengths, as mentioned above, due to the fact that the particle sample is directly exposed to the LED light source, and therefore the stimulation light does not have to travel through the body of the sample holder itself.

In one embodiment of the device 1 where no filter 13a is required, the sample holder 15a and the light mixing rod 11a may be combined or merged in a single element in order to save one element for the device 1.

The particles of the particle sample or samples are embedded in a solid carrier medium or a liquid carrier medium. The solid carrier medium may be water or a bio matrix, e.g. tissue or one or more cells. The liquid carrier medium may be viscous, particularly a polymer or a gel. For carrying out the method according to the invention, it is possible to place different types of particle samples into different wells 2f of the sample holder 15a. In this way it is possible to not only characterize the particle samples 2e only by their heat radiation behaviour, but also in comparison with other particle samples 2e which are e.g. embedded in a different carrier medium or are made of a different material.

Figure 4:
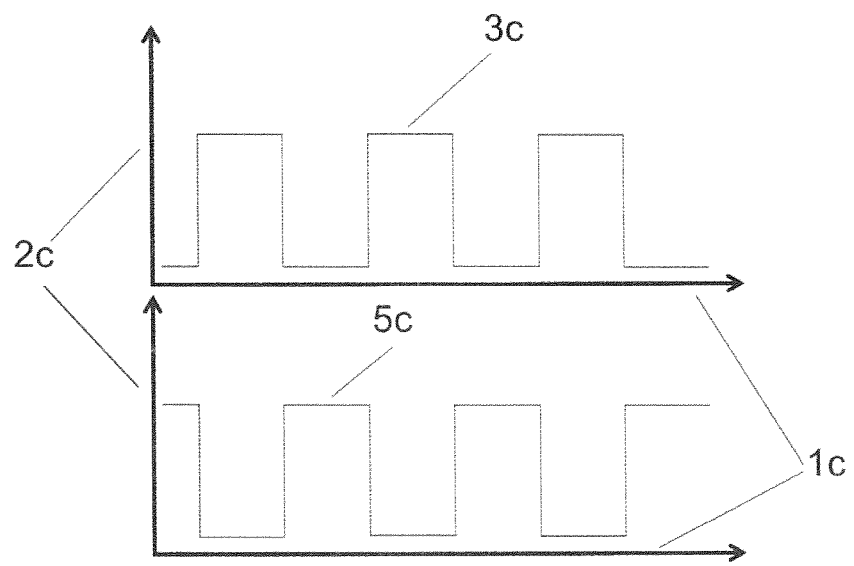
FIG. 4 a diagram of a frequency modulated stimulation pattern for stimulation light emitted by the light source of FIG. 2.

FIG. 4 shows a diagram of an exemplary excitation pattern for stimulation light emitted by the light source of FIG. 2, in other words the first step of the method according to the invention. The upper diagram of the figure shows the course of stimulation with light with the first wavelength and the bottom diagram of the figure shows the course of stimulation with light with the second wavelength. In the figure (as well as in the following FIGS. 5 and 6), the time axes are denoted by the reference 1c and the intensity axes by the reference 2c (first wavelength) and (second wavelength). The references 3c (first wavelength) and 5c (second wavelength) denote the amplitude (intensity) of the light with the respective wavelength.

As can be seen in the figure, light is emitted alternatingly with the first wavelength and the second wavelength. Preferably, the alternating stimulation is done for equal time periods for each pulse of the first wavelength and the second wavelength. It is also preferred that the stimulation interval for one pulse of each wavelength equals the subsequent idle interval (non-stimulation period) for that same wavelength. It is furthermore preferred that substantially no delay is inserted between a pulse of the first wavelength and a subsequent pulse of the second wavelength, as can be seen in the figure.

Several alternatives of the way the stimulation light with the two wavelengths is modulated are described in the following. These different ways are based on frequency modulation or amplitude modulation or a combination of both modulation types. The underlying modulation theory is known to the skilled person and will not be described here in more detail.

For all modulation types it is preferred that the modulation frequency and/or the modulation amplitude is/are constant during one measurement period. Furthermore, an overlapping of stimulation pulses of light with the first wavelength and the second wavelength is undesired in order to reach unambiguous measurement results.

In the first alternative shown in FIG. 4, the light is emitted using frequency modulation with a predefined modulation frequency for both alternating wavelengths. Preferably, the modulation frequency is chosen in the range between 0 Hz and 100 Hz. It is preferred to use a modulation frequency of 1 Hz. It has been found that for the frequency of 1 Hz the Signal to Noise Ratio is good, the images are sharp and the sample behaves quasi adiabatically.

In a second alternative (not shown), the light is emitted using frequency modulation with a first and a second modulation frequency attributed each to one of the two wavelengths of the light, respectively. It is preferred that the first and the second modulation frequency differ by an integer factor. Assuming that the aforementioned stimulation interval and the subsequent idle interval are equal for both wavelengths, this avoids overlapping of stimulation pulses for the two wavelengths.

Figure 5:
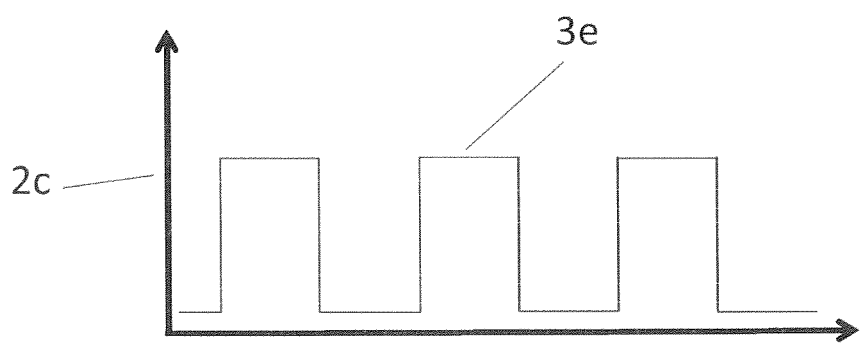
FIG. 5 a diagram of an amplitude modulated stimulation pattern for stimulation light emitted by the light source of FIG. 2.

In a third alternative shown in FIG. 5, the light is emitted using amplitude modulation with a predefined modulation amplitude for both alternating wavelengths 3e. In other words, the modulation amplitude corresponds to the intensity of the emitted light for both wavelengths.

In a fourth alternative (not shown), the light is emitted using amplitude modulation with a first and a second modulation amplitude for each one of the two wavelengths, respectively. In this case different intensities may be applied to the two wavelengths.

Figure 6:
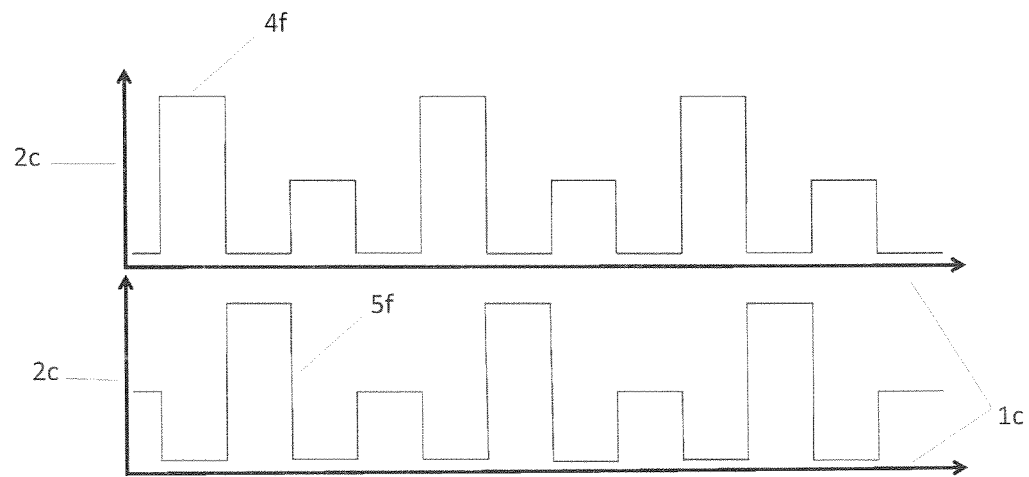
FIG. 6 a diagram of a combined frequency modulated and amplitude modulated stimulation pattern for stimulation light emitted by the light source of FIG. 2.

In a fifth alternative shown in FIG. 6, the light is emitted using amplitude modulation and frequency modulation 4f, 5f for the two wavelengths. The combination of amplitude and frequency modulation allows to retrieve the characteristics of the nanoparticles with more accuracy.

Figure 7:
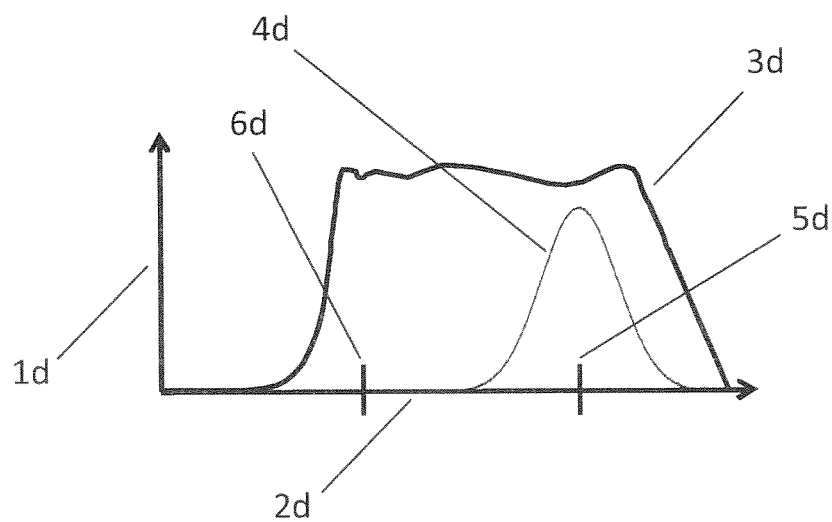
FIG. 7 a diagram of an exemplary absorption distribution for the particle sample over time.

FIG. 7 shows a diagram of an exemplary light absorption distribution for the particle sample over time. In the figure, the horizontal axis denotes the wavelength and the vertical axis denotes the absorption value. The references 5d and 6d denote the first and the second wavelength, respectively, of the corresponding stimulation light for the two LED arrays. The reference 3d shows the absorption distribution of the carrier medium for the particle sample and the reference 4d shows the absorption distribution for the particles of the particle sample only. As can be seen, no absorption by the particles is measured for the second wavelength, in contrast with the first wavelength, where an absorption by the particles is exhibited. At the same time, the carrier is chosen such that it exhibits a substantially constant absorption in the wavelength spectrum spanned by the first and the second wavelength. In this way it is possible to differentiate between the effect (heat radiation) of the stimulation light on the particle sample and the carrier medium during the same measurement. It is therefore not necessary to perform multiple measurements with samples made solely of the carrier medium and samples with the carrier medium containing particles. However, it is noted that in an embodiment of the invention a reference measurement of a sample containing only the carrier medium may be provided. In this case, the reference property derived by said reference measurement may be subtracted from the property of the particle sample determined based on the demodulated image.

To summarize, using stimulation light with two wavelengths it is possible to decouple the carrier medium carrying the particles, which is a necessary element for utilizing the particles, from the particles themselves, i.e. to separate the influence of the carrier medium on the measurement, and hence on the characterization, from the stimulation response of the particles.

As a result of the stimulation, heat radiated by the particles of the particle sample is detected by means of the detector 18a, thereby yielding time-dependent images of a modulated heat distribution pattern for at least a region of the particle sample.

Subsequently, the time-dependent images of the modulated heat distribution pattern are converted into the frequency domain and the images of the modulated heat distribution pattern are demodulated by lock-in thermography (LIT). In this context, both real images Real(f) and imaginary images Im(f) are calculated (f=frequency) from the time-dependent images. This can be subsequently used to determine the physical property of the particle sample or the particles, respectively. For example, calculating the amplitude $$A = \mathrm{SQRT}(\mathrm{Real}(f0)^2 + \mathrm{Im}(f0)^2)$$

where f0 is the modulation frequency, can be used to estimate the intensity of heat radiation of a particle. As another example, the phase $$\mathrm{Phi} = \mathrm{Arctan}(\mathrm{Im}(f0)/\mathrm{Real}(f0))$$

The invention claimed is:

1. A method for characterizing particles producing heat when exposed to light, comprising the steps of:
   stimulating, during a predefined measurement period, at least one particle sample containing at least one particle, alternatingly with homogenous light waves with at least a first wavelength and a second wavelength by at least one light source, wherein the light waves with the first wavelength don't overlap with the light waves with the second wavelength with respect to their time base,
   detecting by a detector heat radiated by the at least one particle of the at least one particle sample as a result of the stimulation, thereby yielding time-dependent images of a modulated heat distribution pattern for at least a region of the at least one particle sample,
   converting the time-dependent images of the modulated heat distribution pattern into the frequency domain and demodulating the images of the modulated heat distribution pattern by lock-in thermography,
   determining a physical property of the at least one particle sample based on demodulated images of heat distribution.

2. The method according to claim 1, wherein the physical property of the at least one particle sample is chosen from the group: location of a certain particle in the at least one particle sample, intensity of heat radiation of the at least one particle sample, intensity of heat radiation of the at least one particle sample as function of their size, shape, material, colloidal state, aggregation state, particle concentration in a carrier medium carrying the particles, or a combination thereof.

3. The method according to claim 1, wherein the light is emitted using frequency modulation with a predefined modulation frequency for both alternating wavelengths, chosen in the range between 0 Hz and 100 Hz, particularly 1 Hz, particularly wherein the modulation frequency is constant during the measurement period.

4. The method according to claim 1, wherein the light is emitted using frequency modulation with a first and a second modulation frequency attributed each to one of the two wavelengths of the light, respectively, particularly wherein the first and the second modulation frequency differ by an integer factor, particularly wherein the first and the second modulation frequencies are each constant during the measurement period.

5. The method according to claim 1, wherein the light is emitted using amplitude modulation with a predefined modulation amplitude for both alternating wavelengths, particularly wherein the modulation amplitude is constant during the measurement period.

6. The method according to claim 1, wherein the light is emitted using amplitude modulation with a first and a second modulation amplitude for each one of the two wavelengths, respectively, wherein the first and the second modulation amplitude are each constant during the measurement period.

7. The method according to claim 1, wherein the light is emitted using amplitude modulation and frequency modulation for the two wavelengths, wherein the modulation amplitude and the modulation frequency are constant during the measurement period.

8. The method according to claim 1, wherein the first and the second wavelength are each chosen independently from one another in a range between 100 nm and 2000 nm, particularly wherein a gap between the first and the second wavelength is of at least 100 nm.

9. The method according to claim 1, wherein the at least one particle of the at least one particle sample is chosen from the group consisting of nanoparticles and microparticles.

10. The method according to claim 1, wherein the at least one particle of the at least one particle sample is embedded in a solid carrier medium or a liquid, particularly viscous, carrier medium, particularly a polymer or a gel or a bio matrix, particularly tissue or cells.

11. The method according to claim 10, wherein a reference property of the carrier medium not containing the at least one particle is subtracted from the physical property of the at least one particle sample determined based on the demodulated image.

12. The method according to claim 1, wherein the alternating stimulation is done for equal time periods for each pulse of the first wavelength and the second wavelength, particularly wherein substantially no delay is inserted between a pulse of the first wavelength and a subsequent pulse of the second wavelength.

13. A device for carrying out the method for characterizing particles producing heat when exposed to light according to claim 1, comprising:
   a homogenous light source adapted to emit light with at least the first and the second wavelength, wherein intensities of the light with the first and the second wavelength are adjustable independently from one another,
   a sample holder carrying the at least one particle sample with the at least one particle, wherein the sample holder is arranged in such a way that the particle sample can be illuminated by the homogenous light source,
   a detector, particularly an infrared camera, configured and arranged in such a way that it detects heat radiated by the at least one particle sample as a result of stimulation of the at least one particle sample with light emitted by said light source, and
   a processing unit electrically connected to the detector and to the light source.

14. The device according to claim 13, wherein the light source is an LED light source with at least two LED-arrays, wherein each LED-array generates light with the first wavelength or the second wavelength, respectively.

15. The device according to claim 14, wherein the LED-arrays are arranged in such way with respect to one another that they interpose, such that an LED of one of the LED-arrays is arranged next to an LED of the other LED-array as seen in at least one spatial direction (x), particularly wherein the LED-arrays have the same number of LEDs.

16. The device according to claim 13, further comprising a light mixing rod for additional light homogenisation arranged between the sample holder and the light source.

17. The device according to claim 13, wherein the sample holder is made of a material which is transparent for the light emitted by the light source and wherein the material has a heat diffusivity below 0.001 m2/s, particularly wherein the material is a plastic or a glass or a transparent polymer.

18. The device according to claim 13, wherein the light source, the sample holder and the detector are arranged in a row, wherein the sample holder is arranged between the light source and the detector, with the particle sample facing the detector, such that light emitted by the light source illuminates the at least one particle sample through the sample holder, or wherein the light source and the detector are both arranged on a same side of the sample holder facing the at least one particle sample.

19. The device according to claim 16, wherein the sample holder and the light mixing rod are combined into a single element.

* * * * *